(12) United States Patent
Horn

(10) Patent No.: US 6,335,526 B1
(45) Date of Patent: Jan. 1, 2002

(54) INFRARED SENSOR SYSTEM TECHNIQUE

(75) Inventor: Stuart B. Horn, Fairfax, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/496,282

(22) Filed: Feb. 1, 2000

(51) Int. Cl.⁷ .......................... H01L 25/00; G02F 1/01; G01J 5/02
(52) U.S. Cl. .................. 250/332; 250/330; 250/340; 250/342

(58) Field of Search ................. 250/332, 330, 250/333, 338.1, 339.1, 339.2, 339.14, 342, 340

(56) References Cited

U.S. PATENT DOCUMENTS 6,255,650 B1 * 7/2001 Warner et al. ............... 250/330

* cited by examiner

Primary Examiner—Hung Xuan Dang
(74) Attorney, Agent, or Firm—Milton W. Lee; John E. Holford; Alain L. Bashore

(57) ABSTRACT

An infrared sensor system technique for fusing sensor outputs for display to a user, including sensor outputs from an internetted system.

7 Claims, 2 Drawing Sheets

INFRARED SENSOR SYSTEM TECHNIQUE

BACKGROUND OF THE INVENTION

1. Field of the Invention

The present invention generally relates to infrared sensor system techniques and more specifically, to a sensor system technique for fusing infrared bandwidths including shortwave infrared wavelengths for internetted infrared sensor systems.

2. Description of Prior Art

IR systems have enabled night vision technology to be used widely in many military applications such as: target acquisition, missile seeker sensors, night driving, and search and track. These systems have not only improved vision at night, but also improved vision through smoke, fog, dust, and haze and simple camouflage. Some limitations of these systems have been high cost, high weight, high input power; inability to see battlefield lasers, sophisticated camouflages, ditches, inability to see if minimal light is not available etc. In addition, the present systems do not solve the problem of friendly fire and force location. Additional problems occur when trying to combine (fuse) separate different technologies to overcome these different problems with the prior art.

Prior art technologies fused for low light level sensors and IR. The problem in fusing these technologies does not allow for camouflage identification because the present camouflage matches vegetation in the 0.6–0.9 micron wavelengths. However, in the 1–2 micron band (SW), no camouflage exisits today that can match the reflectivities of vegetation. The prior art suffers from this major limitation. Also, the 1–2 micron band has much lighter light levels than the 0.6–0.9 micron band and can be used in fog and haze, and lowlight conditions. This is not true for the present low light level sensors. The combination of 1–2 wavelength band and one or both 3–5 micron (mid-wave) and 8–12 micron wavelength (LW) bands solves many of the present fused sensor limitations.

While the prior art has reported using sensor systems, none have established a basis for a specific technique that is dedicated to the task of resolving the particular problem at hand. What is needed in this instance is an infrared sensor system technique for fusing sensor outputs for display to a user, whereby there is produced a viewable scene capable of observing through covered starlight, fog,,and haze, be able to distinguish reflected light, distinguish camouflage from a background in both 0.6–0.9 micron wavelength and 1.0–2.0 micron wavelength ranges, detect laser emission at 1.06 and 1.54 micron wavelength, and detect both surface and buried land mines.

SUMMARY OF THE INVENTION

It is therefore one object of the invention to provide an infrared sensor system technique for fusing sensor outputs for display to a user, whereby there is produced a viewable scene capable of observing through covered starlight, fog, and haze, be able to distinguish reflected light, distinguish camouflage from a background in both 0.6–0.9 micron wavelength and 1.0–2.0 micron wavelength ranges, detect laser emission at 1.06 and 1.54 micron wavelength, and detect both surface and buried land mines.

According to the invention, there is disclosed an infrared sensor system technique for fusing sensor outputs for display to a user, including multiple sensor outputs from an internetted system. Radiation input of a viewed scene is collimated onto at least two focal plane arrays, wherein each focal plane array senses separate bands of infrared radiation with at least one of said two infrared radiation bands being shortwave (SW) infrared radiation. The sensed radiation is converted to electrical signals and processed to fuse all bandwidths as electrical signals, provide contrast and edge enhancement, and spatial filtering which is then output as first output signals. Location data is also received and processed as a second output signal and sensor input from an internetted system is further received and processed as third output signals. The first, second and third output signals are fused and provided to a display for producing a viewable scene capable of being observed through covered starlight, fog, and haze, being able to distinguish reflected light, distinguish camouflage from a background in both 0.6–0.9 micron wavelength and 1.0–2.0 micron wavelength ranges, detect laser emission at 1.06 and 1.54 micron wavelength, and detect both surface and buried land mines.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
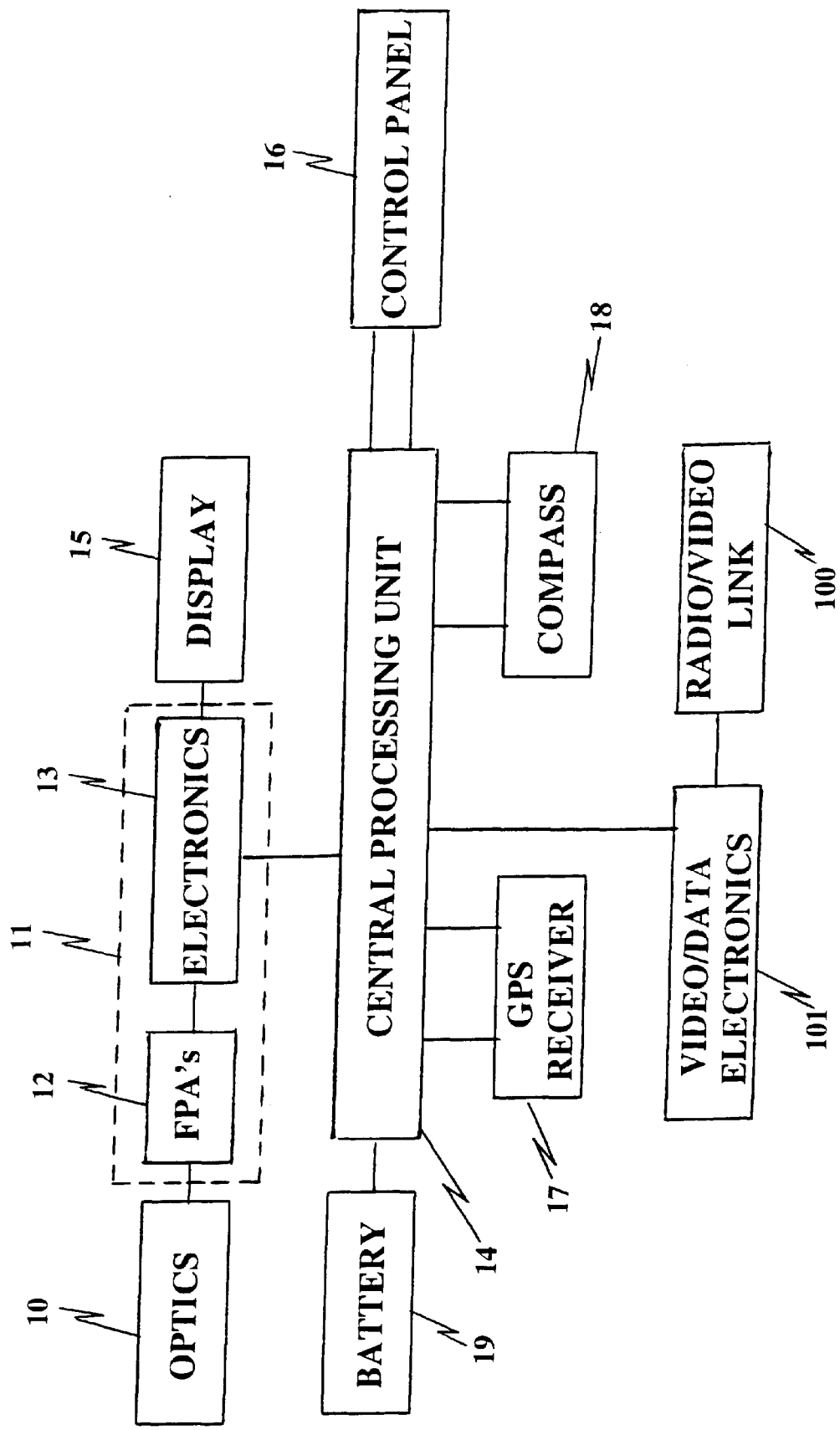
FIG. 1 is a block diagram of the system function.

Referring now to the drawings, and more particularly to FIG. 1, there is shown a block diagram of the system function for the present invention. Optics 10 processes input radiation that is collimated onto a sensor subassembly 11. Sensor subassembly 11 includes one short wavelength sensor (SWS) and at least one other longer wavelength sensor. Each sensor includes a focal plane array 12 and electronics 13 for converting radiation impinging on the FPA to appropriate signals which may be further processed by CPU 14 to be visually displayed to a user by display 15. Electronics 13 allow for contrast and edge enhancement motion detection, and A/D conversion. The user may adjust operation parameters via control panel 16. Ground positioning sensor (GPS) 17 detects positioning data of the user and viewed scene targets which is input to CPU 14 for simultaneous display by display 15. Electronic compass 18 detects compass direction of the viewed scene that is then input to CPU 14 for simultaneous display by display 15. Battery 19 electrically powers the entire system via CPU 14. Digital video link 100 provides for two-way transmission of image, GPS, compass data so that other user's locations and targets may be displayed input to video electronics 101 for display by display 15.

This system can be part of an internetted system linked to other systems. The internetted system is capable of giving coordinates of targets in all kinds of weather conditions and can be used for many applications for: defeating camouflage, penetrating fog and haze, and driving vehicles. The combination of a reflected light sensor and an emitted radiation sensor can cover almost all scenarios. The SWS is sensitive in the 1–2 micron band and the LWS is one sensor sensitive to 8–12 micron band. Optics 10, sensor subassembly 11, CPU 14, display 15, and control panel 16 are all part of a goggle subsystem as the preferred embodiment. Other visual enhancement subsystems used include systems for driving ground and air vehicles and unattended internetted systems.

The short wave sensor may provide data on lasers (1.06 and 1.54 micron), ditches (if the system is used for driving), and camouflage. The long wave sensor provides additional data in the thermal imaging band (8–12). This scene data can be used where visibility is poor (smoke, haze, fog, etc.) and fused with the short wave data, can provide a valuable discriminator for an automated target recognizer (ATR) in separating out target from background clutter. In the driving application, the short wave sensor provides data on ditches, which cannot be seen by the long wave sensor.

The three sensors, SWS, LWS, GPS are either uncooled or moderately TE cooled (−40 C.) resulting in a very low power, low cost, sensor suite using no cryogenic cooling, high vacuum dewar technology, or mechanical scanner. The long wave sensor is an uncooled detector operated at or near room temperature eliminating the need for cryogenic cooling. The SWS sensitive detector surface is in the 1–2 micron band and is able to see reflected light, which is present from the nightglow effect. The energy in this band is more than four times the energy in the visible band and is independent of the position of the moon, making it a more potent sensor than image intensifier systems that need some minimal light. In addition, the SWS can see battlefield lasers since these lasers operate at 1.06 and 1.54 microns, respectively. Image intensifiers cannot see these wavelengths. The LWS is an uncooled 8–12 micron IR detector of the either ferroelectric, bolometric, and pyroelectric type. This sensor images by seeing radiated photons in the wave band they are allowed to see. Both the SWS and LWS are uncooled or moderately cooled thermoelectrically, but they are not cryogenically cooled. Both sensors are hard to camouflage against and in tandem almost impossible to camouflage. Goggle weight for this system can be less than 1.5 pounds. Data input 27 allows for other signals from CPU 14 of FIG. 1 to be input. The other signals include data from electronic compass 18, GPS 17, video electronics 101, and radio/video link 100. Eyepieces 28 and 29 would allow the user to view the output of flat panel display 25.

Figure 2:
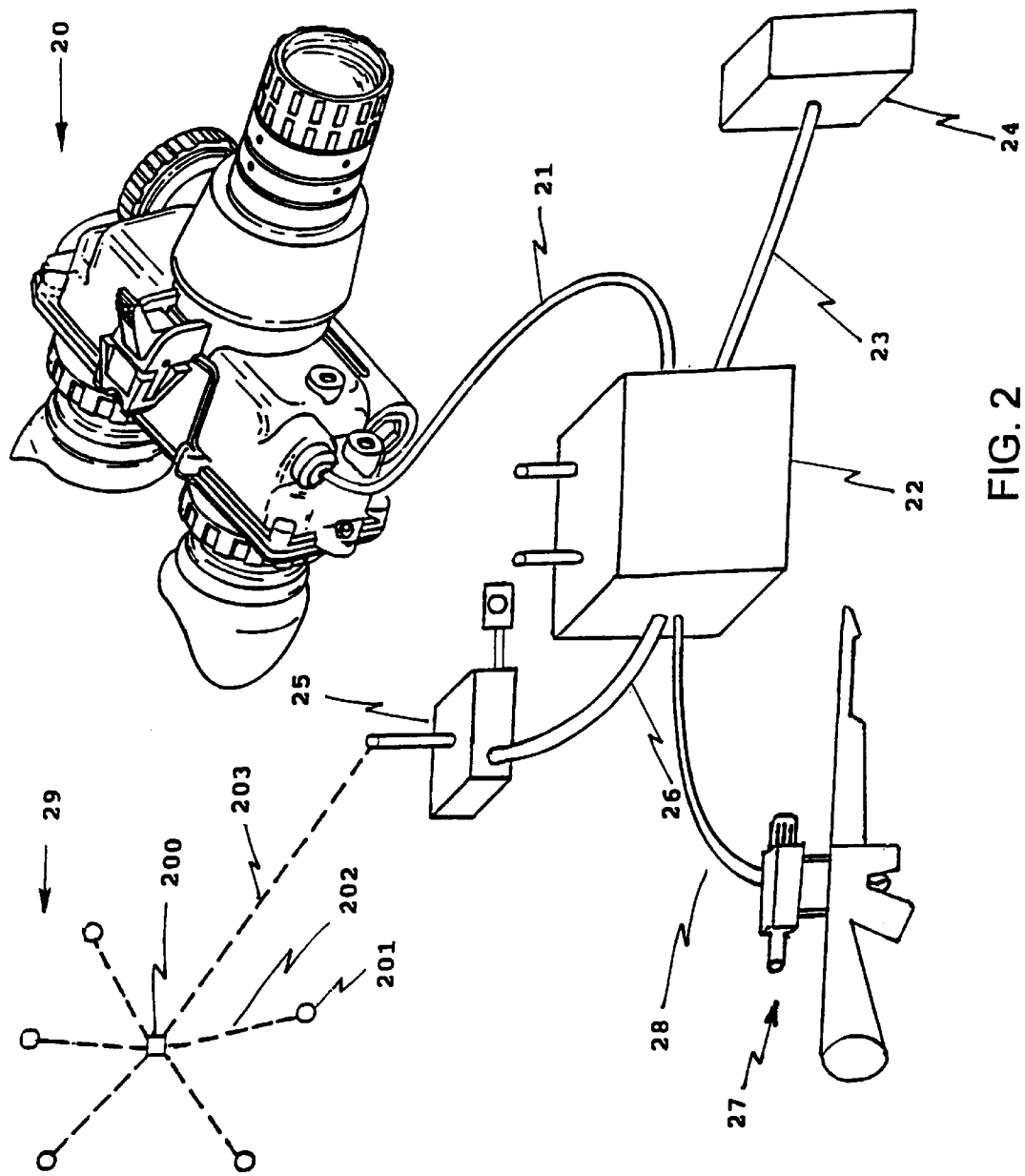
FIG. 2 is a pictorial of the overall system utilized as a preferred embodiment.

FIG. 2 is a pictorial of the overall system utilizing two sensor subsystems. Goggle subsystem 20 includes within readout circuits that utilize fusion algorithms, which processes data from both sensors and provides output signals to a flat panel display. Goggle subsystem is helmet mounted for use by the operator, but may be designed for handheld or vehicle mounted if desired. The readout electronics read out all sensor output signals, performs A/D conversion, spatial and temporal filtering, and fusion of sensor output signals. Goggle subsystem 20 is linked to electronics pack 22 via cable 21. Contained within electronics pack 22 are the electronic compass 18, GPS 17, and video/data electronics 101 of FIG. 1. Electronics pack 22 of FIG. 2 can be configured as a hip or vest pack, which is electrically powered via cable 23 from hip battery pack 24. Radio/video unit 25 allows for the two-way transmission of radio, image, GPS, and compass data, which is electronically linked to electronics pack 22 via cable 26. Optional rifle mounted scope subsystem 27 is linked to electronics pack 22 via cable 28. Rifle mounted scope subsystem 27 includes the same sensors as disclosed for goggle subsystem 20.

The invention is capable of being used for driving at night, communicating with command and control center to transmit data, and can be mounted to act as an IRIS for acquiring scene information. Internetted system 29 is shown in FIG. 2 includes command and control center 200 and individual units such as unit 201, all of which communicate via links, such as link 202. Link 203 is shown in FIG. 2 as linking via radio/video unit 25 the system described as the preferred embodiment of a unit. The above combination leads to a system that can:

a. See in all weather conditions including low light level, covered starlight fog, and haze.

b. Easily distinguish camouflage from background in both 0.6–0.9 micron wavelength and 1.0–2.0 micron wavelength ranges.

c. See battlefield lasers at 1.06 and 1.54 wavelength micron.

d. Detect both surface and buried land mines.

e. See well enough for pilotage and driving.

f. Transmit and receive images and information via digital data communications link.

g. Do all the above in an ultra-small, lightweight, low power, low cost package.

While this invention has been described in terms of preferred embodiment consisting of the disclosed technique, those skilled in the art will recognize that the invention can be practiced with modification within the spirit and scope of the appended claims.

Having thus described my invention, what I claim as new and desire to secure by Letters Patent is as follows:

1. An infrared sensor system technique for fusing sensor outputs for display to a user, including sensor outputs from an internetted system, comprising the steps of:

providing at least two focal plane array sensors each sensitive to separate bands of radiation with at least one sensor being sensitive to shortwave radiation falling within 1.0–2.0 micron bandwidth;

collimating radiation input of a viewed scene onto at least two focal plane arrays;

sensing at least two infrared radiation bands wherein at least one of said two infrared radiation bands is shortwave (SW) infrared radiation as sensed radiation;

converting said sensed radiation to electrical signals;

processing said electrical signals to fuse all bandwidths as electrical signals, provide contrast and edge enhancement, and spatial filtering which is then output as first output signals;

receiving sensed location data;

processing said sensed location data as second output signals;

providing for the receipt of additional inputs from an internetted system to supply location data;

processing said received sensor input as third output signals;

fusing said first, second and third output signals as a fused output signal to a display;

displaying said fused output signal whereby there is produced a viewable scene capable of being observed through covered starlight, fog, and haze, being able to distinguish reflected light, distinguish camouflage from a terrestrial background, detect laser emission at 1.06 and 1.54 micron wavelength, and detect both surface and buried land mines.

2. The infrared sensor system technique of claim 1 wherein said sensing at least two infrared radiation bands includes as another infrared radiation band, longwave (LW) infrared radiation falling within 8.0–12.0 micron bandwidth.

3. The infrared sensor system technique of claim 1 wherein said sensing at least two infrared radiation bands includes as another infrared radiation band, mid-wave infrared radiation falling within 3.0–5.0 micron bandwidth.

4. The infrared sensor system technique of claim 1 wherein the steps further include:

transmitting said first and second output signals to said internetted system.

5. The infrared sensor system technique of claim 1 wherein said sensed location data is ground positioning sensor (GPS) data and electronic compass data.

6. The infrared sensor system technique of claim 1 wherein said sensed location data is for a location of the viewed scene.

7. The infrared sensor system technique of claim 1 wherein said sensed location data is for a location of the at least two focal plane arrays.

* * * * *